US00RE38909E

(19) United States
(12) Reissued Patent
Rahman

(10) Patent Number: US RE38,909 E
(45) **Date of Reissued Patent: *Dec. 6, 2005**

(54) TWINKLE LIGHT SET

(75) Inventor: Najeh Rahman, Harriman, NY (US)

(73) Assignee: Sienna LLC, Oakland, NJ (US)

( * ) Notice: This patent is subject to a terminal disclaimer.

(21) Appl. No.: 10/304,110

(22) Filed: Nov. 25, 2002

Related U.S. Patent Documents

Reissue of:
(64) Patent No.: 6,474,841
Issued: Nov. 5, 2002
Appl. No.: 09/655,901
Filed: Sep. 6, 2000

(51) Int. Cl.[7] ..... F21S 13/14
(52) U.S. Cl. ..... 362/249; 362/252; 362/236; 362/806; 362/226; 307/31; 313/318.12
(58) Field of Search ..... 362/227–229, 362/234, 236–238, 249, 252, 253, 549, 226, 806–808; 313/318.05, 318.09, 318.1; 315/185 R, 185 S

(56) References Cited

U.S. PATENT DOCUMENTS 3,728,067 A * 4/1973 DeGraaf et al. ..... 431/359
3,946,244 A * 3/1976 Davis, Jr. ..... 307/31
5,828,183 A * 10/1998 Wang et al. ..... 315/185 S
5,967,823 A * 10/1999 Tsui ..... 439/280
5,969,469 A * 10/1999 Wang ..... 313/318.1
6,474,841 B1 * 11/2002 Rahman ..... 362/252
6,799,867 B1 * 10/2004 Cheng ..... 362/249
6,806,656 B2 * 10/2004 Rahman ..... 315/185 R

FOREIGN PATENT DOCUMENTS

JP 2000323103 A * 11/2000 ..... H01K/1/64

OTHER PUBLICATIONS

UL Standard for Safety for Christmas–Tree and Decorative Light Outfits, UL 588, 16th Edition, dated Oct. 1, 1990, with Revisions through and including Jan. 3, 1996—namely, pp. 1–8B and 17, including Paragraphs 13.1 through 13.3.
GE 35 String–A–Long Sparkling Lights Set (the "GE Light-Set"), as illustrated by photographs of the product, its packaging and a pertinent catalog sheet, 1995.

* cited by examiner

*Primary Examiner*—Sandra O'Shea
*Assistant Examiner*—Hargobind S. Sawhney
(74) *Attorney, Agent, or Firm*—Amster, Rothstein & Ebenstein

(57) ABSTRACT

A twinkle bulb light set includes, alternately from one end of the light set to an opposite end of the light set, at least one standard bulb socket configured and dimensioned to operatively receive a standard or steady-burning bulb and at least one non-standard bulb socket configured and dimensioned to operatively receive a non-standard twinkle bulb. The standard and non-standard bulb sockets are configured and dimensioned to operatively receive only standard and non-standard bulbs, respectively. Preferably the standard bulb socket is smaller than the non-standard bulb socket in at least one dimension such that the standard bulb socket cannot operatively receive a non-standard bulb, and the non-standard bulbs have at least one dimension greater than that of the standard bulbs, thereby to preclude operative receipt of a non-standard bulb in a standard bulb socket.

16 Claims, 3 Drawing Sheets

FIG. 3
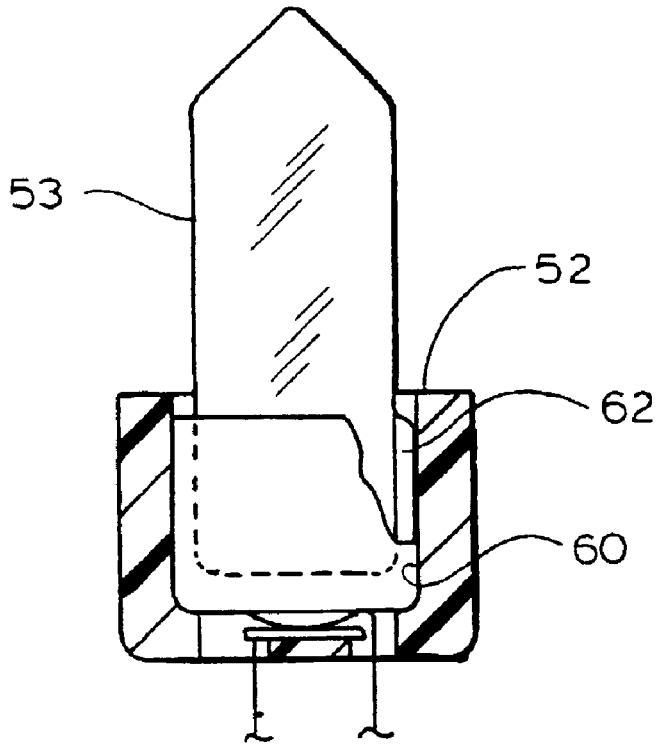
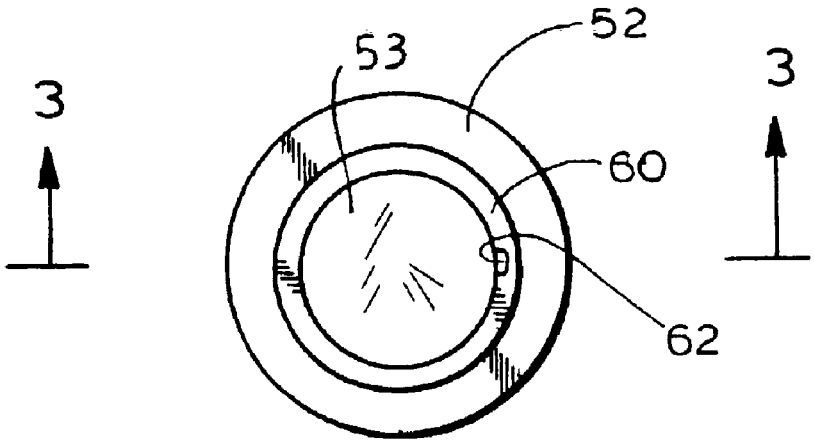
FIG. 2

FIG. 5
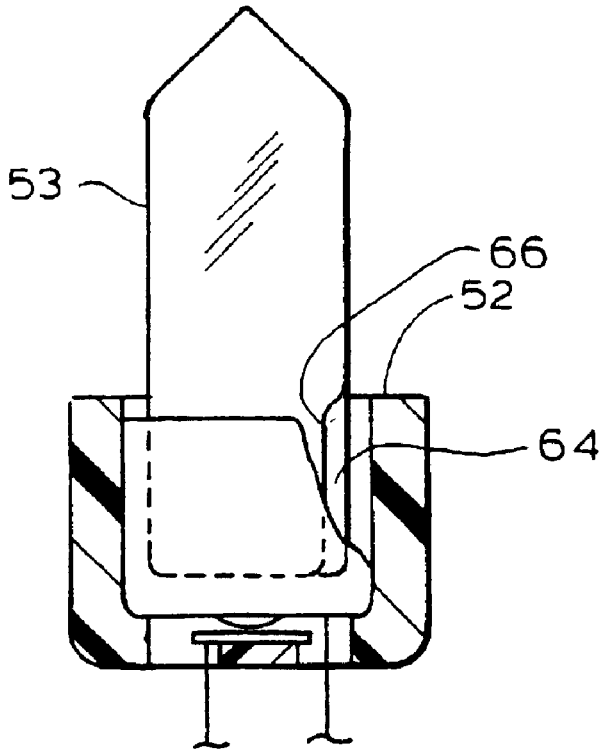
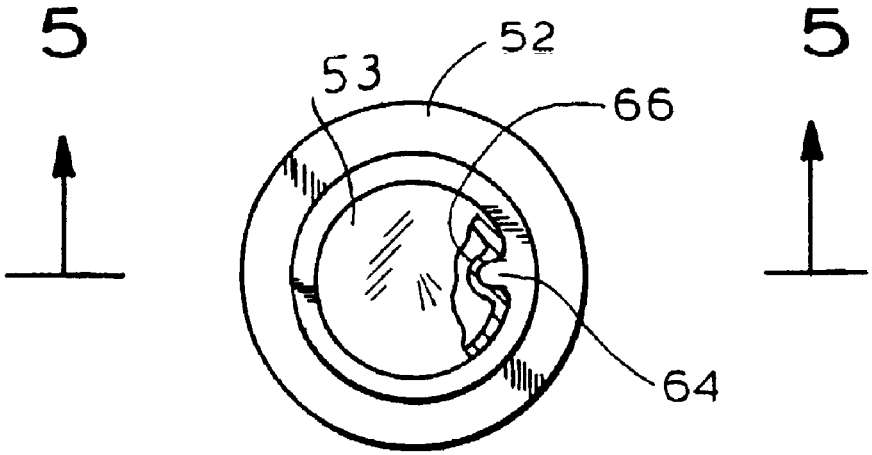
FIG. 4

TWINKLE LIGHT SET

Matter enclosed in heavy brackets [ ] appears in the original patent but forms no part of this reissue specification; matter printed in italics indicates the additions made by reissue.

BACKGROUND OF THE INVENTION

The present invention relates to a twinkle light set, and more particularly to a twinkle light set which meets Underwriters Laboratory (UL) standards for safety.

UL Standard 588 distinguishes between the flasher bulb (LAMP, FLASHING) and the twinkle bulb (LAMP, INDIVIDUAL FLASHING) as follows:

5.16 LAMP, FLASHING—A series-or parallel-connected lamp that automatically cycles on and off by means of a bimetallic strip connected in series with the filament. For series-connected strings, the flashing lamp causes all lamps connected in series with it to flash. For parallel-connected strings, only the flashing lamp is intended to flash.

5.17 LAMP, INDIVIDUAL-FLASHING—A series-connected lamp that automatically cycles on and off by means of a bimetallic strip connected in parallel with the filament. The cycling of the bimetallic strip causes only the individual-flashing lamp to flash by momentarily placing a short across the filament to turn the lamp on and off.

*As used herein, in both the specification and the claims, the following terms have the following meanings:*

*A "flasher bulb" refers to a flashing lamp as defined in UL Standard 588, par. 5.16 ($17^{TH}$ Ed.).*

*A "twinkle bulb" refers to an individual-flashing lamp as defined in UL Standard 588, par. 5.17 ($17^{th}$ Ed.).*

*A "steady-burning lamp" refers to a lamp which lacks a biometallic strip and is either on or off depending upon the voltage supplied to the lamp.*

*A "standard bulb socket" refers to a conventional socket configured and dimensioned to operatively receive a conventional standard bulb,—whether it be a conventional flashing lamp, an individual-flashing lamp or a steady-burning lamp—and to not operatively receive a non-standard twinkle bulb according to the present invention.*

*A "non-standard bulb socket" refers to a socket according to the present invention configured and dimensioned to operatively receive only a non-standard twinkle bulb according to the present invention and not to operatively receive a conventional bulb.*

*A "non-standard twinkle bulb" refers to a twinkle bulb according to the present invention which is configured and dimensioned to be operatively received only in a non-standard bulb socket according to the present invention and not to be operatively received in a standard bulb socket.*

It is well-known to provide a flasher light set wherein a flusher bulb contains a thermally sensitive element which opens and closes the electrical illumination circuit through the bulb according to its "hot" or "cold" state. When the circuit containing the thermally sensitive element opens, there is no electricity supplied to any other bulb in series electrical communication therewith, so that each such series-connected bulb is temporarily extinguished until the element cools and the circuit again closes. Thus, use of even a single flasher bulb causes an entire light set or a section thereof in series communication to have its bulbs flash on and off with the flasher bulb. The appearance of a light set in which all of the bulbs or a section of the bulbs flashes on and off in unison presents an aesthetic attraction to a viewer.

However, an even more appealing an aesthetic affect is produced by a twinkle light set. Instead of a flasher bulb, the tinkle light set uses a twinkle bulb. The twinkle bulb is similar to the flasher bulb in that a thermally sensitive element opens and closes the electrical illumination circuit which provides illumination of the bulb. However, whereas in the flasher light set no current passes through the bulb when the illumination circuit through the bulb is open, in the twinkle light set, each twinkle bulb has in parallel with the illumination filament a bypass or shorting circuit. The bypass circuit (when closed) presents a low resistance, whereas the illuminating circuit (when closed) presents a high resistance. As the twinkle bulb is illuminated through the illumination circuit, it heats up the normally open switch in the bypass circuit, thereby to close the switch and provide an alternative low resistance path through which the current will preferentially flow. This in turn terminates substantially all of the current passing through the high resistance illumination circuit and leads to cooling of the bulb. After a predetermined amount of cooling, the switch in the bypass circuit returns to its normally open state so that current must flow once again through the illumination circuit.

One major difference between a twinkle light set and a flasher light set is that each twinkle bulb acts independently of the other twinkle or standard bulbs in series therewith because the twinkle bulb always passes current therethrough (whether through the illumination circuit or through the bypass circuit). Thus, in a twinkle light set, a wide variety of aesthetic affects may be obtained dependent upon the placement of the twinkle bulbs. For example, a twinkle light set may consist of a plurality of substantially vertical light strings, with each bulb in a given light string being in series. A set of light strings (at least one light string being in each light string set) may contain only ordinary or standard steady-burning bulbs, while an alternate set of light strings (at least one light string being in each light string set) may contain only twinkle bulbs. The standard bulbs remain on constantly, while the twinkle bulbs twinkle on and off independently of each other, seemingly at random, as a counterpoint to provide an enhanced aesthetic appearance. Clearly any given light string(s) may include both standard and non-standard twinkle bulbs for providing a more startling aesthetic experience.

In a conventional twinkle light set typically a large or major proportion of the bulbs (at least 50% thereof) are ordinary to standard steady-burning bulbs. Thus, even if all of the illumination circuits of all of the twinkle bulbs were, through happenstance, to open at the same time, so that each of the twinkle bulbs presented only the low resistance bypass path to the current, the standard bulbs (with their high resistance illumination circuits) would dissipate the current sufficiently to ensure safety of the light set and prevent a dangerous burn-out.

However, if it is known that some twinkle light set users prefer for aesthetic reasons to modify the purchased twinkle light set and convert it to an exclusively twinkle bulb light set by replacing each standard bulb of the light set with a twinkle bulb. As a result, when, by happenstance, all of the illumination circuits of all of the twinkle bulbs are open, the current passes substantially unchecked and undiminished through the low resistance bypass circuits in a decidedly unsafe manner which can lead to melting of conductors, burning of insulation, fires, and the like. While twinkle light sets are usually sold with instructions cautioning against the replacement of standard bulbs with twinkle bulbs, users do not always heed this caution.

Accordingly, recently enacted Underwriters Laboratory (UL) regulations, Section 588, requires that a series-wound twinkle light set have a minimum of fifty bulbs per circuit (to minimize the current passing through any given bulb) and that at least twenty-five of such fifty bulbs be standard steady-burning bulbs (as opposed to non-standard twinkle bulbs). This ensures that in each circuit of a series-wound twinkle light set there are an adequate number of ordinary bulbs to dissipate the current, even if by happenstance all of the twinkle bulbs are passing the current through the low resistance bypass circuits rather than the high resistance illumination circuits.

Accordingly, it is an object of the present invention to provide a twinkle light set which meets UL standards, and in particular Section 588 thereof.

Another object is to provide such a light set which precludes the user from replacing standard steady-burning bulbs with non-standard twinkle bulbs.

A further object is to provide such a light set which is simple and economical to manufacture, use and maintain.

SUMMARY OF THE INVENTION

It has now been found that the above and related objects of the present invention are obtained in a twinkle light set comprising, alternately from one end of a light set to an opposite end of a light set, at least one standard bulb socket configured and dimensioned to operatively receive a standard (e.g., steady-burning) bulb and at least one non-standard bulb socket configured and dimensioned to operatively receive a non-standard twinkle bulb. The standard and non-standard bulb sockets are configured and dimensioned to operatively receive only standard and non-standard bulbs, respectively.

In a preferred embodiment, the interior of the standard bulb socket is sized differently (preferably smaller) in at least one dimension than the interior of the non-standard bulb socket such that the standard bulb socket cannot operatively receive a non-standard bulb.

The invention also encompasses, in combination, a twinkle bulb light set, a plurality of standard (e.g. steady-burning) bulbs and a plurality of non-standard twinkle bulbs. The exterior of the base portion of each of the non-standard bulbs is sized differently (preferably greater) in at least one dimension than the exterior of the base portion of each of the standard bulbs such that the standard bulb socket cannot operatively receive a non-standard bulb. Preferably, the non-standard bulb socket defines a keyway, the non-standard bulb defines a mating key, and the standard bulb socket lacks a mating keyway, whereby a non-standard bulb will not fit in a standard bulb socket.

BRIEF DESCRIPTION OF THE DRAWING

The above and related objects, features and advantages of the present invention will be more fully understood by reference to the following detailed description of the presently preferred, albeit illustrative, embodiments of the present invention when taken in conjunction with the accompanying drawing wherein:

FIG. 2 is a schematic representation of one embodiment of a twinkle bulb in a preferred twinkle bulb socket;

FIG. 3 is a sectional view taken along the line 3—3 of FIG. 2;

FIG. 4 is a schematic representation of another embodiment of a twinkle bulb in another preferred twinkle bulb socket; and FIG. 5 is a sectional view thereof taken along the line 5—5 of FIG. 4.

DETAILED DESCRIPTION OF THE PREFERRED EMBODIMENTS

Figure 1:
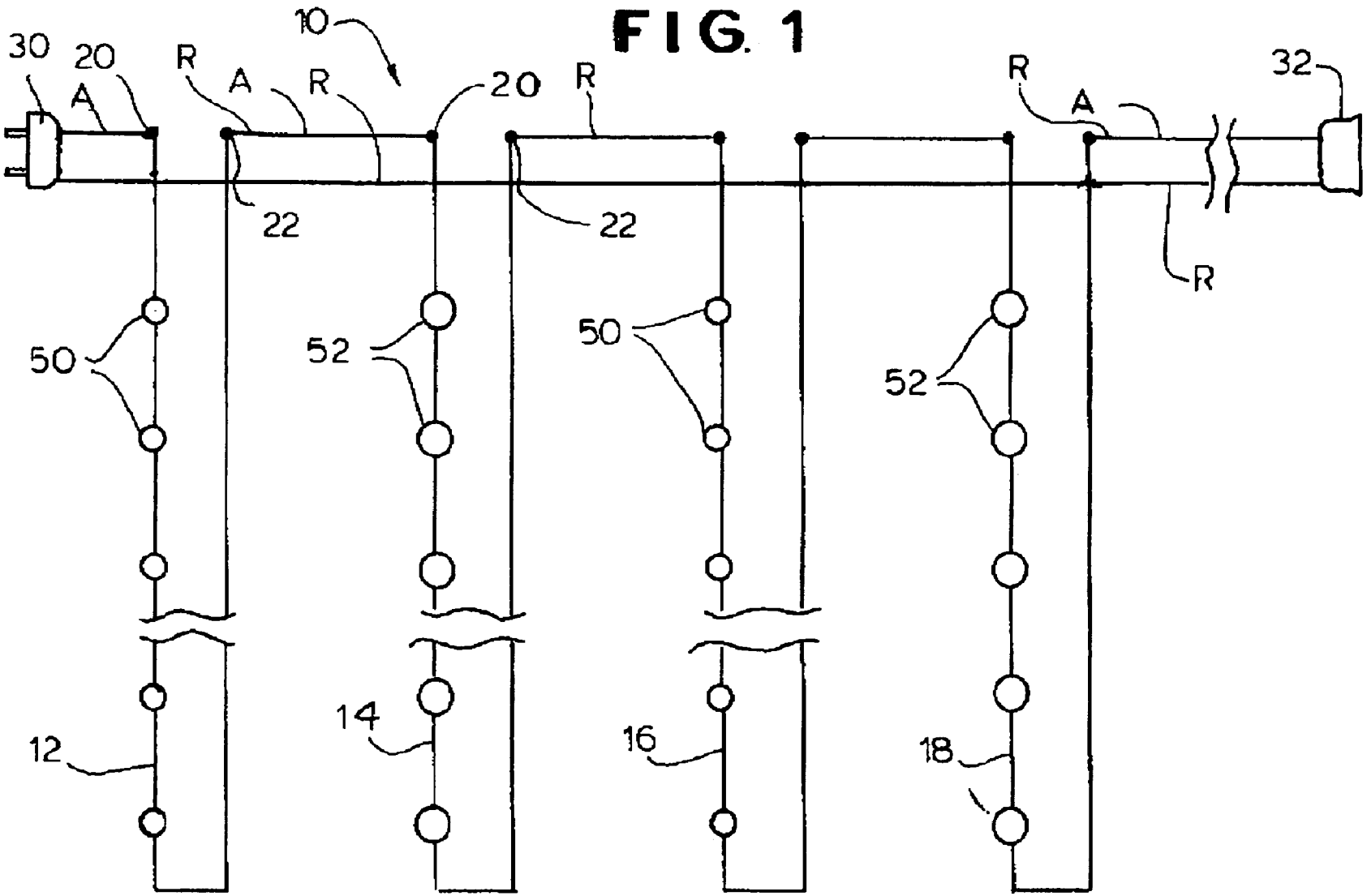
FIG. 1 is a fragmentary schematic view of a twinkle light set having smaller standard bulb sockets and larger non-standard twinkle bulb sockets.

Referring now to the drawing, and in particular to FIG. 1 thereof, therein illustrated is a twinkle light set according to the present invention, generally designated by the reference numeral 10. The illustrated light set 10 is an icicle light set wherein the various bulbs are disposed on light strings depending from the horizontally extending active and return wires A, R which connect the two ends of the light set. While the illustrated light set involves a standard icicle or light string 12, followed by a twinkle light string 14, followed by another standard light string 16, followed by another twinkle light string 18, clearly different icicle light set patterns may be used; for example, each standard light string 12, 16 may be replaced by more than one standard light string and each twinkle light string, 14, 18 may be replaced by more than one twinkle light string. Thus, a group or string set of standard bulb light strings 12, 16 may alternate with a group or set of twinkle light strings 14, 18. Indeed, as will be appreciated by those skilled in the art, the twinkle light set 10 according to the present invention need not be in the form of an icicle light set, and may instead be a net or mesh light set, a patterned light set (for example, forming diamonds rather than rectangles) or the like. The nodes or connections between adjacent light strings may be formed either at the lamp sockets or at the wires connecting the lamp sockets of each light string.

Each standard or twinkle light string 12–18 is connected to the horizontally extending active wire A at point 20 and to the horizontally extending return wire R at point 22. Clearly, the height of each light string 12–18, may be varied to incorporate the desired number of bulbs per light string and the number of light strings in a given light set may be varied to provide a desired number of bulbs in a light set.

In order to preclude the user from modifying the light set 10 after purchase so that it is no longer safe and remains in compliance with UL standards, the light set 10 comprises, alternately from one end 30 of the light set 10 to an opposite end 32 of the light set 10, at least one standard bulb socket 50 and at least one non-standard bulb socket 52. The standard bulb socket 50 is configured and dimensioned to operatively receive the base portion of a standard steady-burning bulb 51, while the non-standard bulb socket 52 is configured and dimensioned to operatively receive the base portion of a non-standard twinkle bulb 53. More particularly, the standard and non-standard bulb sockets 50, 52 are configured and dimensioned to operatively receive the base portions of only standard and non-standard bulbs 51, 53, respectively.

The last requirement may be achieved through a variety of different mechanisms. Preferably the interior of the standard bulb socket 50 is sized differently (as illustrated, smaller) than the interior of the non-standard bulb socket 52 such that the standard bulb socket 50 cannot operatively receive therein a non-standard bulb 53. Alternatively, the interiors of each of the standard bulb sockets 50 may be greater than the exterior of each of the non-standard bulbs 53. Thus, as illustrated in FIGS. 2 and 3, a twinkle light set 10 may be used with a plurality of standard steady-burning bulbs 51 and a plurality of non-standard twinkle bulbs 53 wherein each of the non-standard bulbs 53 has at least one exterior dimension sized differently (as illustrated, greater) than that of each of the standard bulbs 51, so as to preclude operative receipt of a non-standard bulb 53 in the interior of a standard bulb socket 50. Alternatively, as illustrated in FIGS. 4 and 5, each of the non-standard bulbs 53 may have at least one exterior dimension smaller than that of each of the standard bulbs 51 so that the twinkle bulb socket 52 cannot operatively receive therein a standard bulb 51.

For example, as illustrated in FIGS. 2 and 3, the non-standard bulb socket 52 may define an interior surface having an outwardly projecting keyway 60 and the non-standard bulb 53 may define an exterior surface having an outwardly projecting mating key 62 such that the key 62 of the non-standard bulb 53 precludes operative receipt thereof in a standard bulb socket 50 lacking a corresponding keyway 60. Alternatively, as illustrated in FIGS. 4 and 5, the non-standard bulb socket 52 may define an interior surface having an inwardly projecting key 64 and the non-standard bulb 53 may define an exterior surface having an inwardly projecting mating keyway 66 such that the key 64 of the non-standard bulb socket 52 allows operative receipt of a non-standard bulb 53 therein, yet precludes operative receipt therein of a standard bulb 51 lacking the keyway 66 to receive the socket key 64. The object of such designs is to preclude the introduction of a non-standard bulb 53 into a standard bulb socket 50, for the sake of safety and to meet UL standards. The designs may or may not permit the introduction of a standard bulb 51 into a non-standard bulb socket 52, as such a substitution does not involve safety considerations or violate UL standards.

Preferably the standard bulb socket interior is smaller in at least one dimension than the non-standard bulb socket interior, and the non-standard bulb exterior is greater in such at least one dimension than the standard bulb exterior. Preferably, the non-standard bulb socket 52 defines a keyway 60, the non-standard bulb 53 defines a mating key 62, and the standard bulb socket 50 lacks a mating keyway, whereby a non-standard bulb 53 will not fit in a standard bulb socket 50.

It is a matter of choice whether or not the exteriors of the different types of bulb sockets—that is, the standard bulb socket 50 and the non-standard bulb socket 52—are identical in configuration and dimensions (or even color) so long as the user cannot inadvertently or intentionally substitute a non-standard twinkle bulb 53 within an ordinary or standard light socket 50. However, if desired, some clearly visible distinction (such as color or other indicia) may be used to signify to the user that a particular bulb socket is a non-standard bulb socket 52.

While the principles of the present invention have been explained above in terms of a standard steady-burning bulb and a non-standard twinkle bulb, it is irrelevant for the purposes of the present invention whether the standard bulb 51 is a steady-burning bulb or a flasher bulb.

Clearly, the non-standard bulb 53 may fit into the standard bulb socket 50 as long as it is not "operatively" received therein—i.e., does not establish effective electrical communication therewith.

To summarize, the present invention provides a twinkle light set which meets UL standards, and in particular Section 588 thereof, by precluding the user from replacing standard steady-burning bulbs with non-standard twinkle bulbs. The light set is simple and economical to manufacture, use and maintain.

Now that the preferred embodiments of the present invention have been shown and described in detail, various modifications and improvements thereon will become readily apparent to those skilled in the art. Accordingly, the spirit and scope of the present invention is to be construed broadly and limited only by the appended claims and not by the foregoing specification.

I claim:

1. A twinkle light set comprising:

alternately from one end of said light set to an opposite end of said light set, at least one standard bulb socket *electrically* operatively [receive] *receiving* a standard bulb, whether a conventional steady burning or a conventional flashing bulb, and at least one non-standard bulb socket *electrically* operatively receiving a non-standard twinkle bulb;

said standard and non-standard bulb sockets being configured and dimensioned to *electrically* operatively receive only standard and non-standard bulbs, respectively;

*said standard bulb socket being configured and dimensioned not to electrically operatively receive a non-standard bulb because of interference of a laterally larger exterior dimension of the non-standard bulb with a laterally smaller interior dimension of said standard bulb socket, notwithstanding the use of excessive manual force to attempt to overcome such interference.*

2. The light set of claim 1 wherein the interior of said standard bulb socket is sized differently in at least one dimension than the interior of said non-standard bulb socket such that said standard bulb socket cannot *electrically* operatively receive a non-standard bulb.

3. The light set of claim 2 wherein said standard bulb socket interior is smaller in said at least one dimension than said non-standard bulb socket interior.

4. In combination, a twinkle light set of claim 1, a plurality of standard bulbs and a plurality of non-standard twinkle bulbs, the exterior of each of said non-standard bulbs is sized differently in at least one dimension than the exterior of each of said standard bulbs such that said standard bulb socket cannot *electrically* operatively receive a non-standard bulb.

5. The combination of claim 4 wherein said non-standard bulb is greater in said at least one dimension than said standard bulb.

6. In combination, a twinkle light set, a plurality of standard bulbs and a plurality of non-standard twinkle bulbs, said twinkle light set comprising:

alternately from one end of said light set to an opposite end of said light set, at least one standard bulb [whether a conventional steady burning or a conventional flashing bulb] socket *electrically* operatively receiving a standard bulb, *whether a conventional steady burning or a conventional flashing bulb,* and at least one non-standard bulb socket *electrically* operatively [receive] *receiving* a non-standard twinkle bulb;

said standard and non-standard bulb sockets being configured and dimensioned to *electrically* operatively receive only standard and non-standard bulbs, respectively;

the interior of said standard bulb socket being sized differently in at least one dimension than the interior of said non-standard bulb socket such that said standard bulb socket cannot *electrically* operatively receive a non-standard bulb; and the exterior of each of said non-standard bulbs being sized differently in at least one dimension than the exterior of each of said standard bulbs such that said standard bulb socket cannot *electrically* operatively receive a non-standard bulb *due to interference, notwithstanding the use of excessive manual force to attempt to overcome such interference.*

7. The combination of claim 6 wherein said standard bulb socket interior is smaller in said at least one dimension than said non-standard bulb socket interior, and said non-standard bulb is greater in said at least one dimension than said standard bulb.

8. The combination of claim 6 wherein the non-standard bulb socket defines a keyway, the non-standard bulb defines a mating key, and the standard bulb socket lacks a mating keyway, whereby a non-standard bulb will not *electrically operatively* fit in a standard bulb socket.

*9. A twinkle light set comprising:*

*alternately from one end of said light set to an opposite end of said light set at least one standard bulb socket electrically operatively receiving a standard bulb whether a conventional steady burning or a conventional flashing bulb, and at least one non-standard bulb socket electrically operatively receiving a non-standard twinkle bulb;*

*only said non-standard bulb sockets being configured and dimensioned to electrically operatively receive non-standard bulbs;*

*said standard bulb socket being configured and dimensioned not to electrically operatively receive a non-standard bulb because of interference of a laterally larger exterior dimension of the non-standard bulb with a laterally smaller interior dimension of said standard bulb socket, notwithstanding the use of excessive manual force to attempt to overcome such interference.*

*10. The light set of claim 9 wherein the interior of said standard bulb socket is sized differently in at least one dimension than the interior of said non-standard bulb socket such that said standard bulb socket cannot electrically operatively receive a non-standard bulb.*

*11. The light set of claim 10, wherein said standard bulb socket interior is smaller in said at least one dimension than said non-standard bulb socket interior.*

*12. In combination, a twinkle light set of claim 9, a plurality of standard bulbs and a plurality of non-standard twinkle bulbs, the exterior of each of said non-standard bulbs being sized differently in at least one dimension than the exterior of each of said standard bulbs such that said standard bulb socket cannot electrically operatively receive a non-standard bulb.*

*13. The combination of claim 12 wherein said non-standard bulb is greater in said at least one dimension than said standard bulb.*

*14. In combination, a twinkle light set, a plurality of standard bulbs and a plurality of non-standard twinkle bulbs, said twinkle light set comprising:*

*alternately from one end of said light set to an opposite end of said light set, at least one standard bulb socket electrically operatively receiving a standard bulb whether a conventional steady burning or a conventional flashing bulb, and at least one non-standard bulb socket electrically operatively receiving a non-standard twinkle bulb;*

*only said non-standard bulb sockets being configured and dimensioned to operatively receive non-standard bulbs;*

*the interior of said standard bulb socket being sized differently in at least one dimension than the interior of said non-standard bulb socket such that said standard bulb socket cannot electrically operatively receive a non-standard bulb; and the exterior of each of said non-standard bulbs being sized differently in at least one dimension than the exterior of each of said standard bulbs such that said standard bulb socket cannot electrically operatively receive a non-standard bulb due to interference, notwithstanding the use of excessive manual force to attempt to overcome such interference.*

*15. The combination of claim 14 wherein said standard bulb socket interior is smaller in said at least one dimension than said non-standard bulb socket interior, and said non-standard bulb is greater in said at least one dimension than said standard bulb.*

*16. The combination of claim 14 wherein the non-standard bulb socket defines a keyway, the non-standard bulb defines a mating key, and the standard bulb socket lacks a mating keyway, whereby a non-standard bulb will not electrically operatively fit in a standard bulb socket.*

* * * * *